United States Patent [19]

Satoh

[11] Patent Number: 4,615,430

[45] Date of Patent: Oct. 7, 1986

[54] PRECISION PALLET STACKING TYPE STORAGE SYSTEM FOR USE IN CLEAN ENVIRONMENT OR THE LIKE

[75] Inventor: Ryozo Satoh, Tokyo, Japan

[73] Assignee: Tokyo Electron Limited, Japan

[21] Appl. No.: 650,886

[22] Filed: Sep. 17, 1984

[30] Foreign Application Priority Data

Oct. 6, 1983 [JP] Japan .................................. 58-187352
Apr. 17, 1984 [JP] Japan .................................. 59-77320

[51] Int. Cl.$^4$ ............................................. B65G 47/57
[52] U.S. Cl. ................................. 198/465.1; 312/266; 414/237
[58] Field of Search ............... 414/266, 236, 237, 267, 414/787; 198/580, 472, 465.1; 312/266, 267

[56] References Cited

U.S. PATENT DOCUMENTS

| | | | |
|---|---|---|---|
| 1,805,029 | 5/1931 | Baker | 198/472 |
| 1,811,545 | 6/1931 | Goddard | 414/237 |
| 1,965,161 | 7/1934 | Sheflin | 414/237 |
| 1,980,850 | 11/1934 | Clark | 414/237 |
| 2,762,489 | 9/1956 | O'Sullivan | 198/472 X |
| 3,447,664 | 6/1969 | Goedkoop | 198/580 X |

FOREIGN PATENT DOCUMENTS 1278662 11/1961 France .................................. 414/237

Primary Examiner—Robert J. Spar
Assistant Examiner—Ken Muncy
Attorney, Agent, or Firm—Lowe, Price, LeBlanc, Becker & Shur

[57] ABSTRACT

In a storage system suitable for use in clean environments, multiple stacks of pallets on which cassettes or boxes for storing semiconductor wafers or the like are placed, are selectively raised and lowered by ram or lever arrangements, and the topmost and lowermost pallets transported horizontally until located on the top or bottom of another stack.

5 Claims, 4 Drawing Figures

PRECISION PALLET STACKING TYPE STORAGE SYSTEM FOR USE IN CLEAN ENVIRONMENT OR THE LIKE

BACKGROUND OF THE INVENTION

1. Field of The Invention

The present invention generally relates to a pallet stacking type storage system, and more specifically to such a system which is particularly suitable for storing cassettes or boxes in which semiconductor wafers (for example) are disposed.

2. Description of the Prior Art

In order to store semiconductor wafers, it is a common practice to place them in cassettes or containers which are then deposited in a clean environment.

Where the wafers to be stored are small in number, the cassettes can be simply placed on fixed shelves. However, where the number of wafers to be stored is very large, two major drawbacks are encountered, i.e., considerable floor space is required and the cassettes located in high storage positions are difficult to reach, inducing handling difficulties.

One proposal for overcomming the above difficulties has taken the form of storing the wafers on a plurality of movable shelves which are permanently coupled to endless chains carried on vertically arranged sprocket wheels.

This prior art however, has a drawback in that as the chain must be sufficiently slack to ensure smooth circulation thereof. Hence precise positioning of each shelf becomes difficult, rendering this system unsuitable for use in an automatic working system. Furthermore, the chain and sprockets of this system requires lubricant which tends to pollute the clean environment in which the system is located.

SUMMARY OF THE INVENTION

In brief, the present invention features a storage system suitable for use in clean environments, wherein multiple stacks of pallets on which cassettes or boxes storing therein semiconductor wafers or the like are placed are selectively raised and lowered by ram or lever arrangements, and the topmost and lowermost pallets are transported horizontally until located on the top or bottom of another stack.

More specifically, the present invention takes the form of a storage system comprising: a plurality of pallets, the pallets being stacked in first and second stacks; a frame arrangement for vertically guiding the first and second stacks; a first vertical transportation device for moving the first stack of pallets vertically; a second vertical transportation device for moving the second stack of pallets vertically; a first horizontal transportation device disposed at the top of the frame arrangement for moving the top pallet of one of the first and second stacks to the top of the other stack; a second horizontal transportion device disposed at the bottom of the frame arrangement for moving the bottommost pallet of one of the first and second stacks to the bottom of the other stack; and a stopper arrangement for supporting the first and second stacks of pallets in position such that the second horizontal transportation device is capable of moving the bottommost pallet of one of the first and second stacks to the bottom of the other stack.

BRIEF DESCRIPTION OF THE DRAWINGS

Various features and advantages of the present invention will become clear from the following description taken in conjunction with the accompanying drawings in which like blocks or elements are denoted by like reference numerals and in which.

DETAILED DESCRIPTION OF THE PREFERRED EMBODIMENTS

Figure 1:
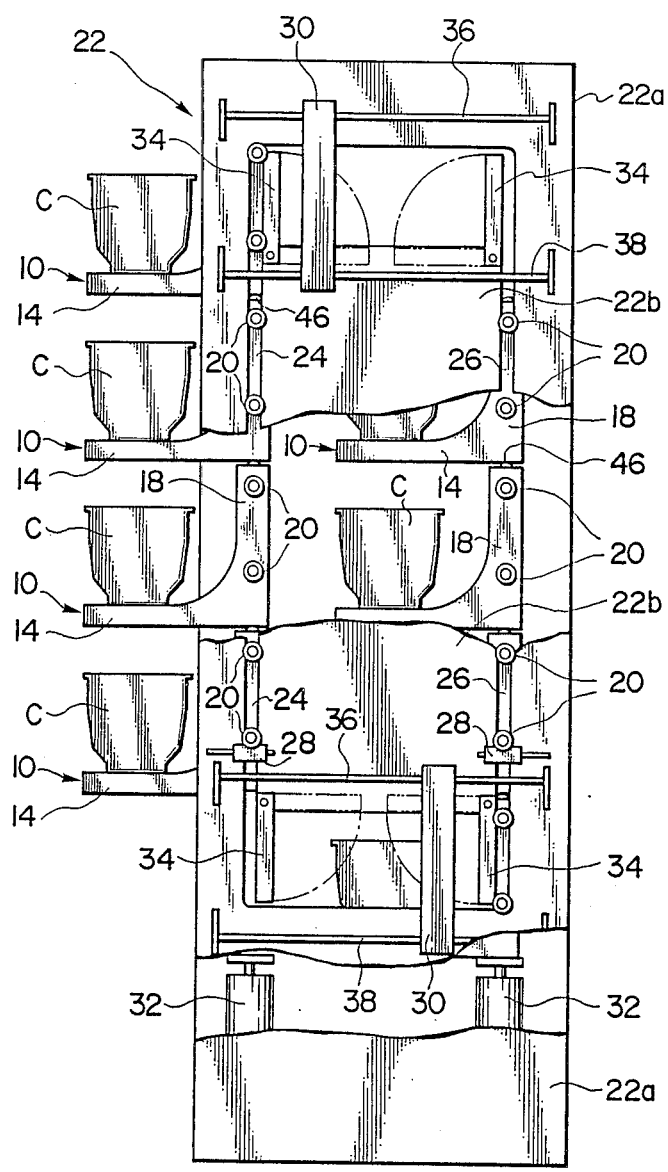
FIG. 1 is a side elevation of a first embodiment of the present invention, wherein a framework is cut away in part for the convenience of explanation.
Figure 2:
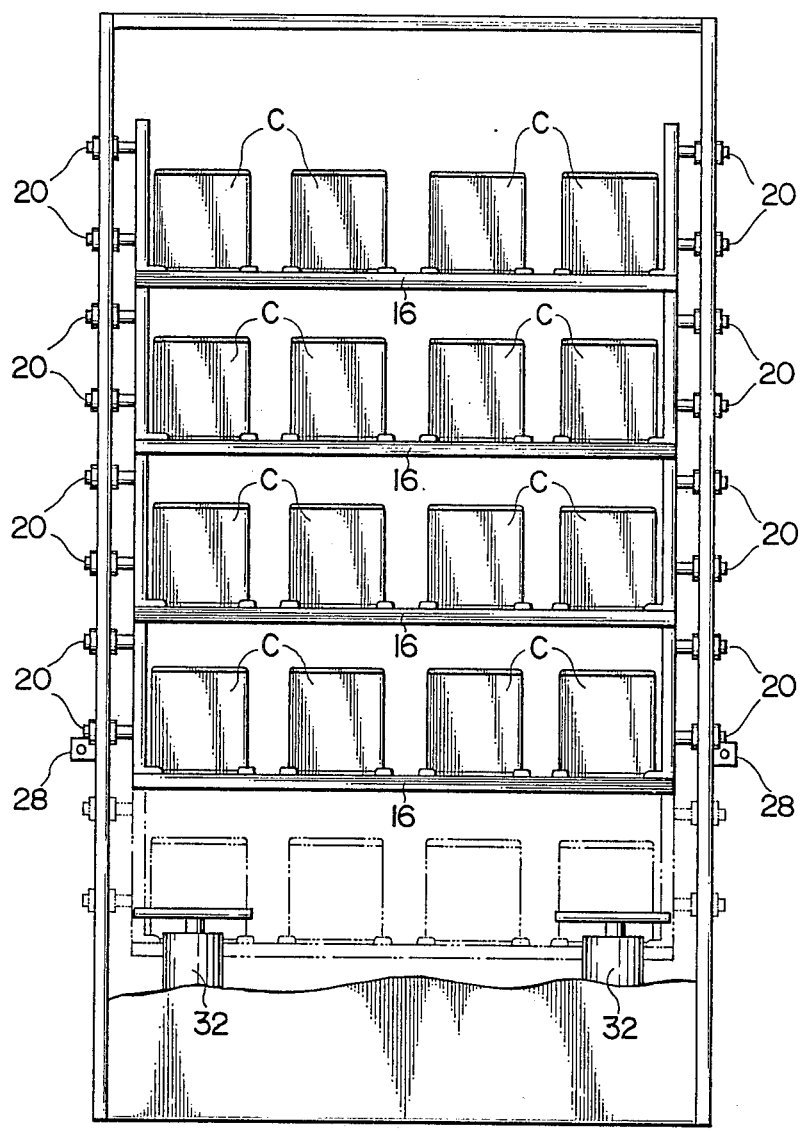
FIG. 2 is a front elevation of the arrangement shown in FIG. 1.
Figure 3:
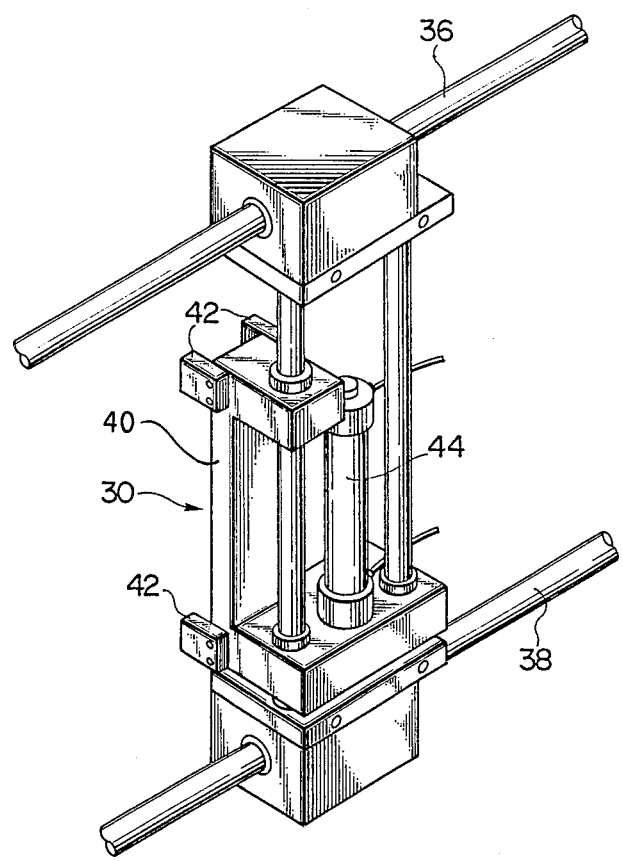
FIG. 3 is a perspective view of a pneumatic or hydraulically operated device which forms a vital part of the arrangement shown in FIGS. 1 and 2.

FIGS. 1 through 3, show a first embodiment of the "pallet stacking" storage system according to the present invention.

As shown, the first embodiment comprises a plurality of shelf-like pallets 10, on which cassettes or containers C or the like can be stored. These containers C can contain semiconductor wafers or the like, for example.

It should be noted that the pallets 10 are not permanently coupled to any conveying means such as a chain or belt, but are merely placed one on top of the other.

Each of the pallets or shelves 10 in this embodiment includes an essentially "L" shaped member fixed at each end thereof. The horizontally extending arms 14 of these "L" shaped members are interconnected by plate-like members 16 on which the containers C are supported. The vertical arm portions 18 of the "L" shaped members are provided with guide rollers or like members 20 which, as shown, are arranged one above the other on the outboard surfaces of the vertical arm portions 18.

A framework generally denoted by the numeral 22 is arranged to define two elongate vertical slots or guide tracks 24, 26 therein. The framework 22 includes, outside and inside panels 22a and, 22b, respectively, which are fixed to each other via suitable coupling members (not shown). The roller members 20 provided on the vertical arms 18 of the "L" shaped members are rotatably and/or slidably received therein in a manner to define first and second stacks of pallets, i.e., a front stack and a rear stack.

Stopper or support members 28 which in this embodiment have pin-like configurations, are arranged to support the two stacks of pallets by engaging the lower surfaces of the lowermost roller members 20 of each stack. These stopper members 28 are movable into and out of the illustated positions by pneumatic or hydraulic control servos (not shown).

Located at the top and bottom of the frame arrangement 22 are hydraulically or pneumatically operated units 30 for moving the topmost and lowermost pallets 10 of the front and rear stacks either horizontally forward or rearward depending on the direction in which it is desired to circulate the pallets comprising the two stacks.

Located below each of the front and rear stacks are lifting/lowering devices. In the illustrated embodiment these devices take the form of hydraulic (or pneumatic) rams 32. These rams 32 are operated in conjunction with the stopper devices 28 in a manner such that when a stack is raised or lowered by the rams 32, the stoppers 28 are withdrawn until the stack has been smoothly raised or lowered by essentially the height of one pallet, whereafter they are reinserted so as to support the stacks and permit the topmost pallet of one stack and the lowermost pallet of the other stack to be horizontally transported from the bottom of one stack to that of the other.

Pivotal levers 34 are disposed, as shown, at the tops and bottoms of each of the elongate guide tracks 24, 26 and arranged to pivot from vertical positions wherein they define the upper and lowermost portions of the guide tracks, to horizontal ones wherein the uppermost and lowermost pallet of the stacks may be moved horizontally. Once a pallet has been moved from one stack to the other, the levers are returned to their vertical positions and thus secure the pallet in question in its appropriate new position. These levers may be moved either synchronously or in turn.

FIG. 3 shows one of the two units 30 used in this embodiment to effect the horizontal transportation of the pallets. As shown, each unit 30 is supported on two horizontally extending shafts 36, 38 and includes a vertically movable member 40 on which two sets of vertically extending prong-like members 42 are mounted. Each pair of prong-like members 42 is arranged to secure a roller member 20, provided on each side of a pallet, therebetween as will become clear hereinafter.

The operation of the above described arrangement will be discussed assuming that pallets are circulated clockwise to obtain access to a selected pallet. For the sake of explanation, the selected pallet is located in the rear stack. First, the lift/lower rams 32 are operated to push the forward stack upwardly by the height of one pallet thus to make room for the lowermost pallet of rear stack thereunder. This, of course, is carried out with the previously mentioned withdrawal and reinsertion of the stoppers 28. Next, the upper horizontal transportion unit 30 is moved forward in order to secure the uppermost pallet of the front stack while the lower horizontal transportation unit is moved rearwardly to secure the lowermost pallet of the rear stack. Upon closely approaching the vertical arm portions 18 of each pallet 10, the vertically movable members 40 of each of the units 30 are raised under the influence of servo devices 44 (which may be either pneumatic or hydraulic) to a height at which they clear the roller members 20 of each pallet. When the transportation units 30 are located immediately opposite the vertical arms 18 the vertically movable members 40 are lowered, lowering the prong-like extensions 42 down on either side of the roller members 20 thus securing same therebetween. Subsequently, the levers 34 are swung from their vertical positions so as to open a path for the pallets 10. The horizontal transportation units 30 are then moved in a manner to shift the pallets they have engaged toward the other of the stacks. Upon completion of the rearward and forward shifting, the pivotal levers 34 are returned to their upright or vertical positions wherein they secure the newly inserted pallet in position, and the vertically movable members 40 are raised so as to release the roller members 20. This procedure is cyclically repeated until the desired pallet has been brought to the appropriate position, at which time a robot or the like may be employed to pick up the appropriate container.

In the above-described operation, the selected pallet can be alternatively accessed by circulating the pallets counterclockwise.

The selection of a desired pallet is implemented, for example, through the use of a plurality of light-reflecting pads and associated photosensors. The outputs of the photosensors are applied to a control circuit for controlling the operation of the arrangement.

In the illustrated embodiment, a plurality of casters or rollers 46 are fixed to the tops of each of the pallets, i.e., the tops of the vertical arm portions 18, to reduce any tendency for undesirable jerky movement to be produced when a pallet is moved from the top of a stack.

Figure 4:
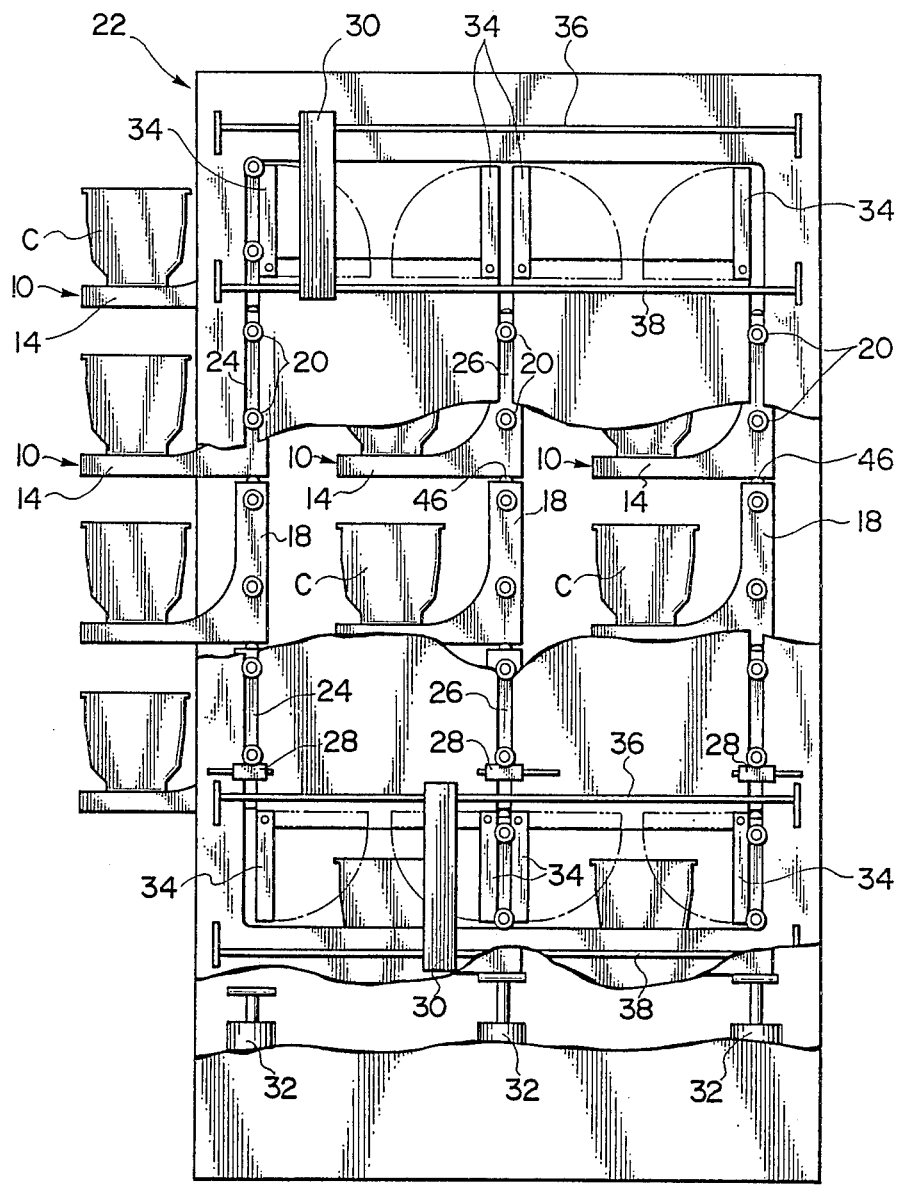
FIG. 4 is a side elevation of a second embodiment of the present invention, wherein a framework is cut away in part for a clearer illustration of the second embodiment.

FIG. 4 shows a second embodiment of the present invention. In this arrangement a plurality of stacks are formed and the system which characterizes the present invention is arranged to selectively raise and lower a selected one of the stacks in a manner to enable quick and ready access to any one of the pallets in the stacks. As the mode via which this embodiment may be operated will be clear to those skilled in the art of storage systems further description of this embodiment will be omitted for brevity.

In the foregoing, the use of a microprocessor to control the operation of the lift/lower rams, pivotal levers and stopper members is deemed advantageous.

As will be appreciated, with the present invention, as the pallets are placed one on the other, it is possible to move a pallet with precision to a desired location, at which time a robot or the like device can safely retrieve from or place fragile items into the storage system without the need for human supervision. Further, as the pallets are stacked one on the other, the need for chains or the like which tend to disperse oil or the like lubricant into the atmosphere of the clean environment is obviated.

The foregoing description shows only preferred embodiments of the present invention. Various modifications will be apparent to those skilled in the art without departing from the scope of the present invention which is only limited by the appended claims.

What is claimed is:

1. A storage system comprising:
 a plurality of pallets, said pallets being stacked in first and second stacks;
 a frame arrangement comprising first and second guide slots for vertically guiding said first and second stacks;
 a first vertical transportation device for moving said first stack of pallets vertically;
 a second vertical transportation device for moving said second stack of pallets vertically;
 a first horizontal transportation device disposed at the top of said frame arrangement for moving the top pallet of one of said first and second stacks to the top of the other stack;
 a second horizontal transportation device disposed at the bottom of said frame arrangement for moving the bottommost pallet of one of said first and second stacks to the bottom of the other stack;
 a first stopper arrangement for supporting said first and second stacks of pallets in position such that said second horizontal transportation device is capable of moving the bottommost pallet of one of said first and second stacks to the bottom of the other stack; and first, second, third and fourth pivotal levers disposed at the tops and bottoms of said first and second guide slots respectively, said first, second, third and fourth pivotal levers being pivotal between positions wherein they respectively define part of said first and second guide slots to positions wherein they open a path for a pallet to be moved horizontally.

2. A storage system as claimed in claim 1, wherein said first and second vertical transportation devices elevate and lower said first and second stacks of pallets through the height of the pallet, respectively, each time they are operated.

3. A storage system as claimed in claim 1, wherein said frame arrangement includes first and second guide slots and wherein each of said pallets includes a guide member, the guide members of said first stack of pallets being received in said first guide slot and the guide members of said second stack of pallets being received in said second guide slot.

4. A storage system as claimed in claim 1, wherein each of said pallets includes a roller disposed at the top thereof, said roller engaging the bottom of a pallet stacked thereon for facilitating the smooth horizontal movement of the pallet placed thereon.

5. A storage system as claimed in claim 1, further comprising:
   a third stack of pallets vertically guided by said frame arrangement;
   a third guide slot in said frame for vertically guiding said third stack;
   a third vertical transportation device for moving said third stack of pallets vertically with respect to said frame arrangement; and
   a second stopper arrangement for supporting said third stack of pallets,
   said third stack of pallets being arranged with respect to said first and second stacks so that said first and second horizontal transportation devices may selectively move the topmost and lowermost pallets of said first, second and third stacks horizontally to the selected stack; and
   fifth, sixth, seventh and eighth pivotal levers disposed at the tops and bottoms of said second and third guide slots respectively, said fifth, sixth, seventh and eighth pivotal levers being pivotal between positions wherein they respectively define part of said second and third guide slots to positions wherein they open a path for a pallet to be moved horizontally.

* * * * *